T. J. CLARK, L. H. DYKE & G. EDWARDS.
STARTING DEVICE FOR INTERNAL COMBUSTION ENGINE
APPLICATION FILED NOV. 20, 1911. RENEWED MAY 22, 1916.

1,191,062.
Patented July 11, 1916.
3 SHEETS—SHEET 1.

WITNESSES
F. C. Fliedner
N. B. Keating

INVENTORS
T. J. Clark
L. H. Dyke
Geo. Edwards
BY
Fm. Wright
ATTORNEY

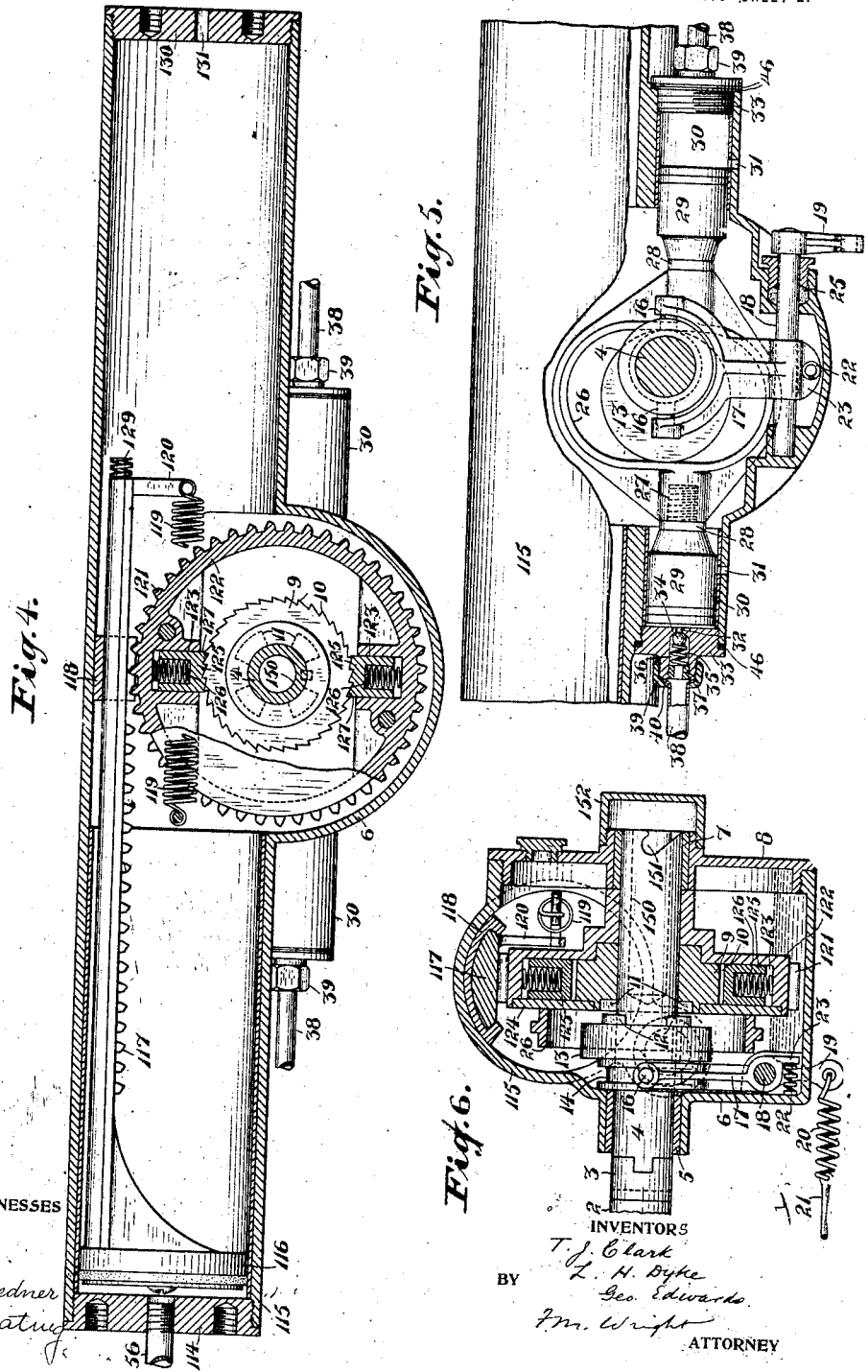

T. J. CLARK, L. H. DYKE & G. EDWARDS.
STARTING DEVICE FOR INTERNAL COMBUSTION ENGINES.
APPLICATION FILED NOV. 20, 1911. RENEWED MAY 22, 1916.
1,191,062.
Patented July 11, 1916.
3 SHEETS—SHEET 3.
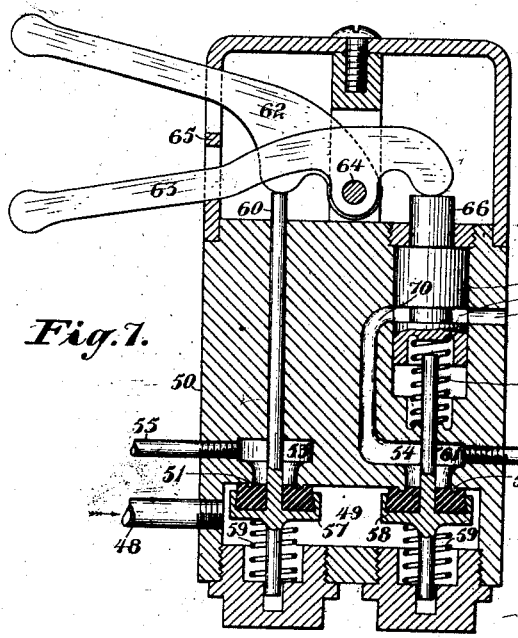

UNITED STATES PATENT OFFICE.

THOMAS J. CLARK AND LOUIS H. DYKE, OF OAKLAND, AND GEORGE EDWARDS, OF BERKELEY, CALIFORNIA, ASSIGNORS, BY MESNE ASSIGNMENTS, TO THOMAS J. CLARK, OF OAKLAND, CALIFORNIA, AND FRANK W. SIMPSON, OF BERKELEY, CALIFORNIA, TRUSTEES.

STARTING DEVICE FOR INTERNAL-COMBUSTION ENGINES.

1,191,062.  Specification of Letters Patent.  Patented July 11, 1916.

Application filed November 20, 1911, Serial No. 661,321. Renewed May 22, 1916. Serial No. 99,221.

*To all whom it may concern:*

Be it known that we, THOMAS J. CLARK, LOUIS H. DYKE, and GEORGE EDWARDS, citizens of the United States, residing, respectively at Oakland, in the county of Alameda, Oakland, county of Alameda, and Berkeley, in the county of Alameda, and State of California, have invented new and useful Improvements in Starting Devices for Internal-Combustion Engines, of which the following is a specification.

This invention relates to improvements in starting devices for internal combustion engines of the character described in our applications for U. S. Patents No. 599,021, filed December 23, 1910, and No. 636,462, filed July 1, 1911, one object of the present invention being to simplify as much as possible the construction of said apparatus without reducing its efficiency.

A further object is to provide means whereby a supplementary fuel supply can be given the engine, subsequently to compression, or even after the starting of the engine, and especially whereby it may be given under conditions as nearly as possible, resembling those obtaining during the normal action of the engine.

A further object is to provide means whereby this fuel supply is injected directly into the combustion chamber, both when the engine is stationary and when it is in motion, and to provide means whereby, when the intake valves are closed, the fuel flows back down the manifold, ready to return at the proper time for use.

A further object is to provide means for variably delivering the fuel so that both charging of the combustion chamber and compressing of the charge can be made simultaneously, or either may be made independently of the other.

A further object is to provide controlling means actuated in a single movement for simultaneously charging the combustion chamber and compressing the charge.

A further object is to provide a construction of pressure cylinder and compression pump convenient to be attached to machines not specially adapted therefor.

Figure 1:
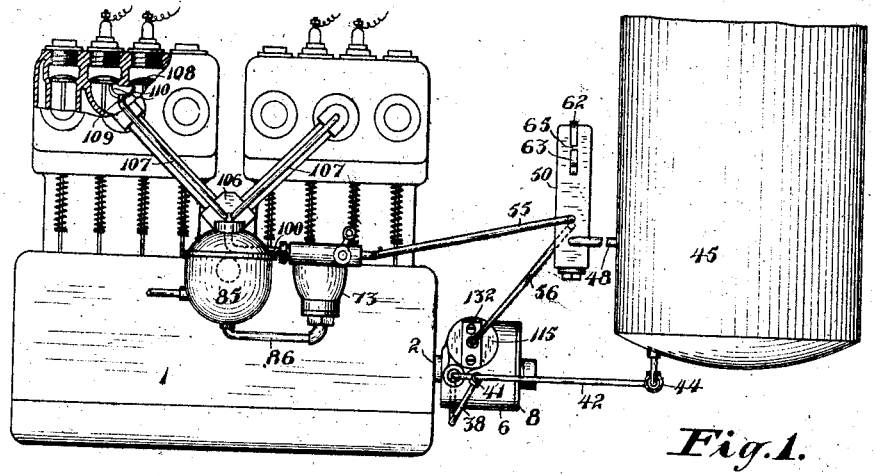
Figure 2:
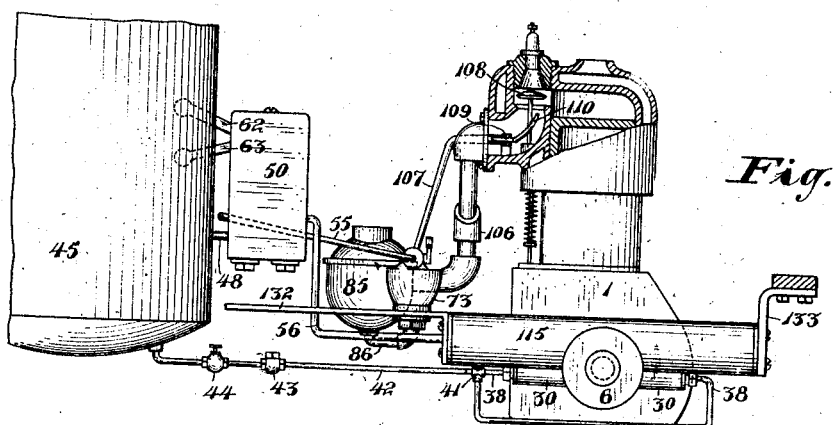
Figure 3:
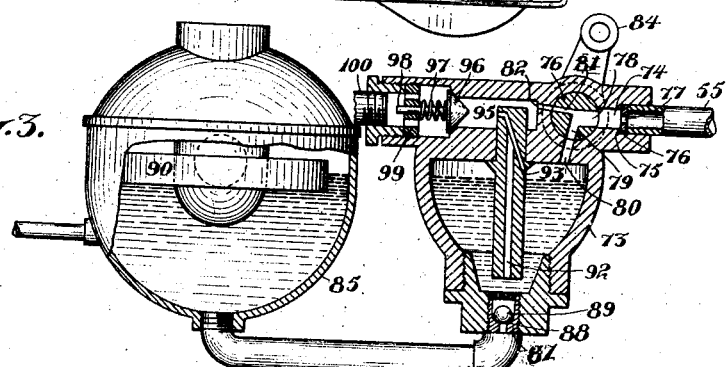

In the accompanying drawings, Figure 1 is a side view of the apparatus; Fig. 2 is a broken front view thereof; Fig. 3 is an enlarged broken side view of the carbureters; Fig. 4 is a longitudinal section through the pressure cylinder; Fig. 5 is a longitudinal section through the pump; Fig. 6 is a cross-sectional view through the pressure cylinder; Fig. 7 is a sectional view of the air controlling valves; Fig. 8 is a similar view of a modification; Fig. 9 is a sectional view of a modified form of internal combustion chamber; Fig. 10 is a broken side view of a nozzle from the secondary carbureter; Fig. 11 is a plan view thereof; Figs. 12 and 13 are perspective views of modifications of said nozzle; Fig. 14 is a sectional view of a modified form of secondary carbureter; Fig. 15 is a side view of a modified form of clutch for connecting a pinion with the cranking shaft.

Referring to the drawing, 1 indicates a casing of an internal combustion engine, having a shaft 2. To an end of said shaft, (Fig. 6) projecting from said casing, is operatively connected, as shown at 3, the shaft 4 of a starting device, said shaft 4 having one bearing 5 in a casing 6 of said starting device, and the other bearing 7 in a circular plate 8 which is screwed to said casing to inclose the starting mechanism. To said starting shaft is secured a wheel 9, the periphery of which has ratchet teeth 10, the purpose of which will be hereinafter described. Said wheel having, in one face thereof, sockets 11 adapted to receive lugs 12 extending from the face of, and integral with, an eccentric 13 loose upon the shaft 4. Said eccentric is secured to a grooved collar 14, engaged by pins 16 carried by the forked end of an arm 17 mounted upon a rock shaft 18, said shaft having its bearings in the casing 6, and extending to the outside of said casing and being there connected to a crank arm 19. The outer end of said crank arm is connected to one end of a spring 20, the other end of which is connected to a rod 21, leading to a suitably located foot lever (not shown) by which said crank arm can be operated. The spring 20 is interposed between the crank arm and the rod 21 to cause the jaws to enter the sockets immediately upon registry therewith, and prevent jarring of the driver's foot in the interval of time before said jaws so register. A coiled spring 22, interposed between the casing and a tongue 23 extending from said arm, returns the clutch to its disengaging position when the pressure of the foot is withdrawn. Since the casing 6 is made liquid-tight and contains oil for the lubrication of the parts contained therein, a stuffing box 25 is provided around the shaft 18 where it passes out of the casing. By the motion of the shaft of the internal combustion engine, rotary motion is thus imparted to the eccentric 13. Said eccentric rotates within a closed elongated yoke 26, the sides of which are extended, and in each of said extensions is screwed, as shown at 27, the end of a piston rod 28, connected to a piston 29, which reciprocates in a cylinder 30. Into each cylinder 30, air is admitted through one or more intake holes 31 in the side thereof, and by the pressure of the piston, is, forced outward through an outlet hole 32 in the head 33 thereof, which is movably closed by a valve 34 pressed by a coiled spring 35 within a cylindrical conduit 36 within said head, the outer end of said spring 35 abutting against a tube 37 screwed in the outer end of said conduit. Said head 33 is connected with a tube 38, a collar 39 screwed on a reduced portion of said head and having a flange 40 surrounding the flaring end of said tube 38. These tubes, leading from the two outer ends of the cylinders 30, are connected, as shown at 41, to a single tube 42, leading through a check valve 43, and a controlling valve 44, to a compressed air tank 45, in which the compressed air by the movement of the pistons 29 is stored. In order to vary the degree of minimum pressure to which the air is compressed, the minimum space between the head of each cylinder and the corresponding piston is varied, by variably interposing washers 46 between the head and the end of the cylinder.

Compressed air is delivered from the compressed air tank 45 by a pipe 48 into a chamber 49 within a valve casing 50. Said compressed air chamber 49 communicates through two valve seats 51, 52, with two chambers 53, 54, from which lead pipes 55, 56, and the passages through said valve seats are controlled by valves 57, 58, pressed against said seats by coiled springs 59, and actuated by valve rods 60, 61. The valve rod 60 is directly operated by a lever 62 and the valve rod 61 indirectly by a lever 63, said levers being fulcrumed at 64 and extending outside the casing and into such position that they may be conveniently operated, either of them alone or both together, a stop 65 being provided to limit the movement of either lever. The lever 62, when operated directly contacts with the end of the valve rod 60 and depresses the valve 57 from its seat, but the lever 63, when moved, contacts with the contracted end of a plunger 66, which reciprocates in a bearing 67 in the valve casing and is normally raised by a coiled spring 68 against the pressure of said lever 63. Said plunger, in its normal or inoperative position, is out of engagement with the end of the valve rod 61, but, when sufficiently depressed, it moves into engagement therewith and causes the valve 58 to be depressed from its seat. The pipe 56 delivers compressed air to a cylinder, hereinafter described, and, after delivery has taken place, and the plunger 66 has risen to its upper limiting position from the force of the coiled spring 68, the air can flow from said cylinder by a conduit 70, reading to an annular conduit 71 around a reduced portion of the plunger connected with a conduit 72 leading to the atmosphere, and can thus escape. However, when operating said valve 58, the plunger descends a sufficient distance to cut off communication between the conduits 70 and 72, before it impinges upon the end of the valve rod 61, and opens the valve, so that, when said valve 58 is open, no compressed air can escape by the conduits 70 and 72 to the external atmosphere.

The pipe 55 leads into a conduit 74 formed in the casing of a secondary carbureter 73 and in said conduit between the end of the pipe 55 and an annular shoulder 75 of said conduit, is interposed a disk 76 having a small aperture 77, since it is necessary that the aperture permitting the entrance of the compressed air into said conduit should be less than the internal cross-sectional area, of said pipe 55. In said conduit 75 is a three-way rotary valve 76, having a crank arm 84 operatively connected in any suitable manner with the throttle of the engine or with any other preferred device. Said valve has an entrance passage 78 communicating with the conduit 74, a passage 79 adapted to communicate with a conduit 80 leading downward into the upper portion of the secondary carbureter chamber, and a passage 81 adapted to connect with a conduit 82 formed in said carbureter casing. The secondary carbureter casing is connected with a main carbureter casing 85 by a pipe 86 leading from the bottom of the latter to the bottom of the former, said pipe 86 being connected with a head 87 screwed into said secondary carbureter casing, and the end of said pipe so connected being formed with a valve seat 88, having a valve 89 thereon preventing back flow of gasolene. A float 90 in the primary carbureter limits the height of the gasolene in both chambers.

The secondary carbureter casing is provided with a vertical conduit 92, which extends down to within a short distance from the bottom of the secondary carbureter casing, and, intersecting said vertical conduit, is an oblique conduit 93 leading from the air space at the top of said secondary carbureter chamber. Said conduit 93 discharges into an atomizing chamber 95 into which also leads the conduit 82 already described. Said atomizing chamber is closed by a valve 96 pressed against its valve seat by a coiled spring 97 around a valve stem 98, and abutting against an apertured disk 99, said valve thus controlling the passage to a pipe 100.

The following is the mode of operation of this portion of the apparatus. Part of the compressed air admitted through the aperture 77 flows by the conduit 80 into the carbureter chamber 73, and, by pressure upon the surface of the gasolene therein, causes said gasolene to flow upwardly in the conduit 92. The air, however, escapes from the upper portion of said carbureter chamber by the oblique conduit 93, and impinges upon the gasolene entering said conduit 93 from the conduit 92, and atomizes it, forcing it into the atomizing chamber 95. In this chamber it is mixed with the remainder of the air passed through the aperture 77 and which enters the atomizing chamber by the conduit 82. The proportions of the mixture, may, however, be varied by turning the valve 76, so as to reduce the size of, or entirely close, the opening into the conduit 82 while not materially reducing the size of the passage into the conduit 80. In this way the richness of the mixture of hydrocarbon and air may be varied as desired. The mixture of hydrocarbon vapor and air thus obtained can be delivered to any part of the conduit in which the external air is normally charged with fuel and conveyed to the engine. It may even be delivered by a special contrivance, as shown in Fig. 9, to the end of an internal combustion chamber of the engine, the pipe 100 in this case being connected with a larger conduit 101 for air to the end of a sleeve 102, which is attached to the end of the internal combustion chamber 103, said end of the pipe being closed against back pressure due to the internal combustion of the engine by a check valve 104 having a spring 105 closing the end of the pipe, but sufficiently weak to permit the valve to be opened by the pressure of the mixture supplied to the cylinder. However, the preferred form of our invention and an important feature thereof consists in an arrangement whereby we supply this starting mixture through the same conduits by which the mixture is supplied in the ordinary running of the engine. We extend the pipe 100 to a location immediately opposite to the place where the manifold 106 branches out from the carbureter, and at this place the pipe 100 communicates with branch pipes 107, each pipe 107 being introduced at its terminal portion into the interior of the terminal portion of the corresponding branch pipe of the manifold, so that said pipe 107 discharges the mixture at the outlet end of said branch manifold pipe and in close proximity to the fuel inlet valve 108. A pipe 109 (Figs. 10, 11) is connected to said branch pipe 107 having two nozzles 110, one for each of the valve openings supplied by the branch pipe 107 and so directed that a jet of the mixture will flow into a combustion chamber upon the opening of the valve. The purpose is to supply fuel at each intake valve, by a fuel conduit, and the construction will vary to attain this end where the construction of the engine varies. These intake valves however, open at different times for the several combustion chambers of an engine having a plurality of cylinders. For effective use of this construction, the conduits leading to the intake openings of the several combustion chambers should be of such internal resistance that the quantity of vaporized fuel delivered through the several conduits is substantially the same. The mixture which is discharged from each nozzle at a time when the corresponding valve is closed will impinge upon the closed valve, and the hydrocarbon vapor will fill the chamber surrounding said nozzle, and the manifold leading thereto, ready to be drawn upon at the opening of the corresponding intake valve. If the jet of mixture is delivered at a high velocity, a very slight condensation will take place, owing to the pressure due to the impact. This may be avoided by using a tube 107 of comparatively large diameter as shown at 111 in Fig. 12 or by forming said tube with an outlet end which flares outwardly, resulting in a slower outward movement of the mixture, as shown at 112 in Fig. 13, or the result of which will be that the same amount of mixture will be delivered, but under much less pressure, and velocity. However, nozzles 110 and 112 have the advantage of being able to project fuel through an open intake valve into the combustion chamber when the engine is stationary.

When the fuel has been delivered into the air conduit of the engine by operating valve 57 to admit compressed air to the secondary carbureter, it is now necessary to turn the engine shaft to first cause suction of said charge to take place and thus assist it in being supplied to the internal combustion chamber and then to compress it in said chamber. For this purpose the lever 63 is also operated, causing compressed air to be admitted to the pipe 56. Said pipe 56 leads through the head 114 of a cylindrical portion 115 of the casing in which portion is a piston 116 having formed integral therewith a rack 117. By the admission of compressed air into said cylindrical portion 115, the piston is propelled within the cylinder, causing the rack 117 to move longitudinally therein in a guide 118 against the tension of a coiled spring 119 attached to an arm 120 extending from the rack and also attached to said cylinder 115. When said rack has traveled a short distance, the first advancing tooth thereof engages one of a series of teeth 121 formed on the periphery of a wheel 122 loose on the shaft 4. In chambers 123 formed in the interior of said wheel and closed by an annular plate 124 are pawls 125 pressed inwardly by coiled springs 126 abutting against the periphery of said wheel. Said pawls have teeth 127 engaging the ratchet teeth 10 of the ratchet wheel 9, heretofore described as being keyed to the shaft 4, which is operatively connected with the engine shaft. By reason of this construction a longitudinal movement of the piston 116 imparts a rotary movement to the shaft 4 and to the engine shaft, thereby causing a movement of the piston in one of the combustion chambers of the engine which is on intake; first, to draw in the mixture by suction, and then, upon the return movement of that engine piston, to compress the charge and raise its temperature sufficient to insure ignition by the sparking device. When the engine is started, the pressure of the compressed air, acting upon the piston 116 does not interfere with the rotation of the engine shaft, because the pawls 125 are pushed back within their chambers 123 by the ratchet teeth 10 of the wheel 9. When pressure is removed from the lever 63, the plunger 66 returns to its normal position under the action of the coiled spring 68, and, as soon as the plunger has reached a height permitting communication between the conduits 70 and 72, compressed air escapes from the cylinder 115 by said conduits into the external atmosphere. The piston 116 and rack 117 then return under the tension of the coiled spring 119.

The end of the cylinder remote from the pipe 56 is closed by a head 130, having an outlet aperture 131. The heads 114, 130 are connected to brackets 132, 133, which extend to, and are supported on, suitable parts of the frame of the automobile. A spring 129 attached to the advancing end of the rack prevents said end striking said head 130.

Since the valves 57 and 58 are capable of independent control, the valve 57 permits of admission of fuel to the engine, either by continuous flow, or by intermittently supplied jets, either before, during or subsequent to the operation of the compressed air, as previously described, to first draw in the charge and then compress the same. When the engine is warm, the normal supply of mixture is sufficient, provided that its temperature be raised by compression, and the valve 57 is not required to be operated. This arrangement therefore permits the quantity of fuel supply to be varied according to the temperature of the engine. It sometimes happens that the normal suction supply is not sufficient when first starting the engine. By the mechanism above explained, the auxiliary supply can be continued subsequently to the compression and starting of the engine, and thus permits of this defect being remedied by adding to the normal supply an auxiliary supply.

In cases where it is not desired to provide an apparatus whereby the compressed air for actuating the auxiliary fuel supply, and for turning the engine shaft are independently operated, a simpler form of valve mechanism may be used. This is shown in Fig. 8 and it will be observed that in this form the lever 62 and the valve 57 are omitted, and the pipe 56 is connected to two pipes 135 and 136, one of which takes the place of the pipe 55 and the other the pipe 56 in Fig. 7.

In Fig. 14 is shown a modification of the secondary carbureter. The conduit 79 leads to a small chamber 136, and out of this chamber leads the atomizing air conduit 93. A small conduit 137 also leads from the chamber 136 into the interior 73 of the carbureter, to give air pressure on the gasolene. A vent hole 138 allows air to escape from the carbureter, and by varying the relative sizes of the air inlet 137 and outlet 138 the pressure of the air on the gasolene, and the quantity fed, may be regulated with ease, to prevent delivering an excessive supply of fuel to the engine.

Fig. 15 illustrates a modification of the means for imparting motion to the shaft 4 from the pinion 9. To the shaft 4 is keyed a web 139, having jaws 140, forming a pivot for a finger 141. In contact with the interior surface 142 of the pinion is an annular friction band 143 jointed at 148 and having inward projections 144, 145, in contact with the finger 141, one on each side thereof. On the side of this friction band 143 opposite to the projections is a lug 146 projecting so that it can engage an extension 147 of the web 139. When the pinion is rotated the friction band is carried forward, causing the projection 144 to press against the finger 141, canting it against the projection 145, and thus prying them apart and causing the band to grip the pinion. On the reverse motion of the pinion, the friction band rests on the finger 141 to its free position, and the contact of the lug 146 with 147 prevents a friction grip, in this direction. The rotation of the pinion is conveyed through the finger 141 to the web 139, and thence to the shaft 4. The shaft 4 is, at its end remote from the engine shaft 2, provided with a deep longitudinal socket 150, adapted to receive a crank pin of a crank arm, the extreme end of said shaft 4 being formed at its periphery with a notch 151 to engage the crank, so that, if there is no pressure of air, the shaft can be cranked in the usual manner. A cap 152, screwed upon the plate 8, serves to inclose the construction last described.

We claim:—

1. A starting device for an internal combustion engine, comprising means for transmitting the motion of said engine to compress air, means for applying the pressure of said compressed air to cause a stream of air to impinge on hydrocarbon and produce a jet of hydrocarbon and air, means for conveying said jet to a combustion chamber of said engine, means for introducing to said jet a supply of air, supplementary to, and independent of, the air supply used to produce said jet, and a sparking device, said means for producing said jet being operable during the normal action of the engine.

2. A starting device for an internal combustion engine, comprising means for transmitting the motion of said engine to compress air, means for applying the pressure of said compressed air to cause a stream of air to impinge on hydrocarbon and produce a jet of hydrocarbon and air, means for conveying said jet to a point adjacent to the inlet valve of said engine, means for causing to mingle therewith air, supplementary to and independent of the air supply used to produce said jet, means for conveying the mixture into a combustion chamber of said engine, and a sparking device.

3. A starting device for an internal combustion engine, comprising means for transmitting the motion of said engine to compress air, means for applying the pressure of said compressed air to cause a stream of air to impinge on hydrocarbon and produce a jet of hydrocarbon and air, means for conveying said jet to a combustion chamber of said engine, means for introducing to said jet, a supply of air supplementary to, and independent of, the air supply used to produce said jet, and a sparking device.

4. A starting device for an internal combustion engine comprising means for transmitting the motion of said engine to compress air, means for applying the pressure of said compressed air to cause streams of air to enter the combustion chambers, means for applying said pressure to cause a second stream of air to impinge on hydrocarbon and produce a stream of spray or vapor, means of separating said stream into branch streams and causing said branch streams individually to mingle with the streams of air which enter the several combustion chambers and a sparking device.

5. In a starting device for an internal combustion engine, means for supplying to said engine fuel, supplementary to the normal fuel supply thereof, comprising a casing of a vessel for holding hydrocarbon, having an inlet for admitting compressed air, and being so constructed that the admission of compressed air produces a jet of vapor from the hydrocarbon therein, said casing having a mixing chamber into which said jet enters, and having an independent compressed air inlet into said mixing chamber, means for closing said independent inlet, and means for admitting compressed air to both of said inlets.

6. In a starting device for an internal combustion engine, means for supplying to said engine fuel supplementary to the normal fuel supply thereof, comprising a vessel for containing liquid hydrocarbon provided with an inlet for compressed air, with an escape vent larger than the inlet, with a vertical conduit in which the hydrocarbon rises due to the pressure of the compressed air admitted through said inlet, and with a conduit arranged to convey an independent stream of compressed air, said conduit intersecting the first-named conduit and with a chamber into which said last named conduit discharges.

7. In a starting device for an internal combustion engine, means for supplying to said engine fuel supplementary to the normal fuel supply thereof, comprising a vessel for containing liquid hydrocarbon provided with an inlet for compressed air, with an escape vent larger than the inlet, with a vertical conduit in which the hydrocarbon rises due to the pressure of the compressed air admitted through said inlet, and with a conduit arranged to convey an independent stream of compressed air, said conduit intersecting the first-named conduit, with a chamber into which said last named conduit discharges, and independent means for admitting compressed air into said chamber.

8. The combination with a combustion cylinder of an internal combustion engine, of a main carbureter therefor, a secondary carbureter, means for applying the pressure of compressed air to said secondary carbureter to produce a stream of hydrocarbon vapor, a conduit for conveying said stream, and a nozzle connected to said conduit and discharging at the inlet valve of the combustion chamber.

9. The combination with a combustion cylinder of an internal combustion engine, of a main carbureter therefor, a conduit leading from said main carbureter to the inlet valve of said combustion chamber, a secondary carbureter, means for applying the pressure of compressed air to said secondary carbureter to produce a stream of hydrocarbon vapor, a nozzle in said conduit discharging adjacent to said inlet valve, and a conduit leading from said secondary carbureter and connected to said nozzle outside said first-named conduit.

10. The combination with combustion cylinders of an internal combustion engine, of a main carbureter therefor, conduits leading from said main carbureter to the inlet valves of said combustion chambers, a secondary carbureter, means for applying the pressure of compressed air to said secondary carbureter to produce a stream of hydrocarbon vapor, nozzles in said conduits discharging adjacent to said inlet valves, and conduits leading from said secondary carbureter and connected to said nozzle outside said first-named conduits.

In testimony whereof we have hereunto set our hands in the presence of two subscribing witnesses.

THOMAS J. CLARK.
LOUIS H. DYKE.
GEORGE EDWARDS.

Witnesses:
FRANCIS M. WRIGHT,
N. B. KEATING.